United States Patent [19]
Ozawa et al.

[11] Patent Number: 5,882,533
[45] Date of Patent: Mar. 16, 1999

[54] FIELD EMISSION BASED PRINT HEAD

[75] Inventors: Lyuji Ozawa, Hopewell Junction, N.Y.; Chun-hui Tsai, Hsinchu, Taiwan

[73] Assignee: Industrial Technology Research Institute, Hsin-Chu, Taiwan

[21] Appl. No.: 679,975

[22] Filed: Jul. 15, 1996

[51] Int. Cl.⁶ .................................................. B44C 1/22
[52] U.S. Cl. ........................ 216/11; 216/27; 347/256; 347/238
[58] Field of Search .................. 216/27, 11; 347/256, 347/238

[56] References Cited

U.S. PATENT DOCUMENTS

| | | | |
|---|---|---|---|
| 4,794,062 | 12/1988 | Oka et al. | 430/31 |
| 4,827,290 | 5/1989 | Yoritomo et al. | 346/107 R |
| 5,012,279 | 4/1991 | Nakajima et al. | 355/205 |
| 5,015,912 | 5/1991 | Spindt et al. | 313/495 |
| 5,112,709 | 5/1992 | Yamazaki et al. | 430/46 |
| 5,153,483 | 10/1992 | Kishino et al. | 315/3 |
| 5,229,331 | 7/1993 | Doan et al. | 437/228 |
| 5,785,873 | 7/1998 | Huang | 216/11 |
| 5,814,924 | 9/1998 | Komatsu | 313/309 |

*Primary Examiner*—R. Bruce Breneman
*Assistant Examiner*—Shamim Ahmed
*Attorney, Agent, or Firm*—George O. Saile; Stephen B. Ackerman

[57] ABSTRACT

A photoprinter is described, including a print head comprising parallel substrates. The bottom substrate supports an array of microtips that rest on cathode columns. Gate lines, orthogonally disposed relative to the cathode columns are located at the top level of the microtips and have openings through which the microtips can emit electrons, due to field emission, which bombard a nearby conductive phosphor layer, thereby emitting light. A bundle of transparent fibers, cast in a suitable medium, are permanently and transparently attached to the upper surface of the top substrate and are in one to one alignment with the microtips. The far side of the fiber bundle may be ground and polished to fit the contours of a rotatable photosensitive drum. A method for manufacturing the print head is also provided.

3 Claims, 4 Drawing Sheets

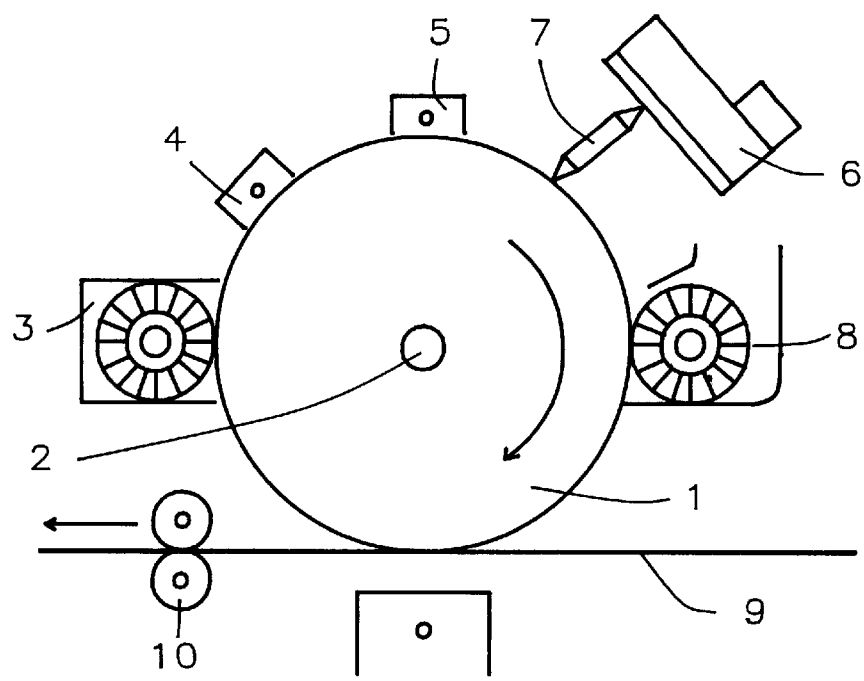
FIG. 1 – Prior Art
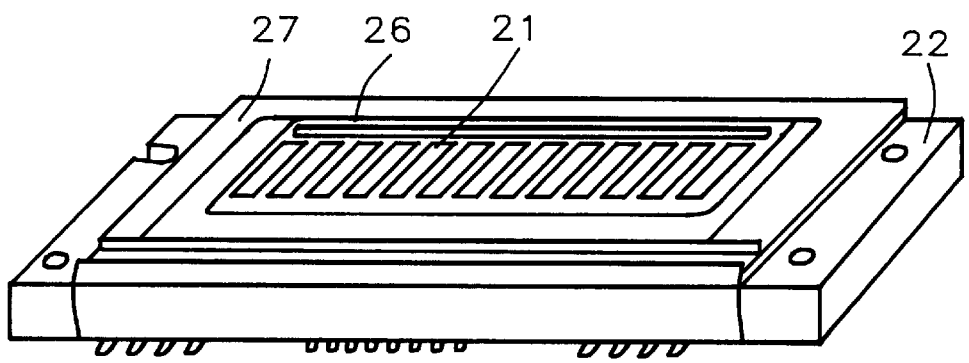
FIG. 2 – Prior Art

FIELD EMISSION BASED PRINT HEAD

BACKGROUND OF THE INVENTION (1) Field of the Invention

The invention relates to the general field of photoprinters, more particularly to print heads based on field emission devices.

(2) Description of the Prior Art

FIG. 1 is a schematic illustration of a typical photoprinter of the prior art as described by, for example, Oka et al. (U.S. Pat. No. 4,794,062 December 1988). An electrostatic drum 1, having a cylindrical shape and seen end-on in the figure, is capable of rotation about an axis 2. With the drum rotating in clock-wise direction (in this example) the photoprinting process begins with a mechanical cleaning of the drum surface by suitable mechanism 3 such as, for example, a scraper blade.

The freshly cleaned surface is then exposed to electrostatic discharge unit 4 following which it receives a uniform electrostatic charge from charging unit 5. The charged surface now passes beneath light image source 6, said light being focused onto the drum by focusing means 7. Most commonly, light image source 6 is an array of light emitting diodes (LEDs).

Wherever light from source 6 strikes the drum's surface, the local electrostatic charge is neutralized so that a charged negative image of the pattern formed by the LEDs remains on the drum's surface. As the drum continues its rotation, it passes toner dispenser 8 where toner is electrostatically attracted to said charged image. Finally, toner is transferred, with little or no loss of image quality, to paper 9 which is being pulled past the drum by rollers 10.

A closeup view, in isometric projection, of a typical LED print head is shown in FIG. 2. The actual light source is linear array 26 of LEDs. These are driven by Integrated Circuits (ICs) such as 21. Excess heat is removed through heat sink 22. The entire array is protected by means of glass cover 27. Print heads of this type are relatively expensive and deliver light of relatively low intensity. This in turn slows down the rate at which image information can be transferred to the drum.

Cold cathode electron (or field) emission devices (FEDs) are based on the phenomenon of high field emission wherein electrons can be emitted into a vacuum from a room temperature source if the local electric field at the surface in question is high enough. The creation of such high local electric fields does not necessarily require the application of very high voltage, provided the emitting surface has a sufficiently small radius of curvature.

The advent of semiconductor integrated circuit technology made possible the development and mass production of arrays of cold cathode emitters of this type. In most cases, cold cathode field emission displays comprise an array of very small conical emitters, or microtips, each of which is connected to a source of negative voltage via a cathode conductor line or column. Another set of conductive lines (called gate lines) is located a short distance above the cathode lines and is orthogonally disposed relative to them, intersecting with them at the locations of the microtips, and connected to a source of positive voltage. Both the cathode and the gate line that relate to a particular microtip must be activated before there will be sufficient voltage to cause cold cathode emission.

The electrons that are emitted by the cold cathodes accelerate past openings in the gate lines and strike a conductive phosphor screen that is located a short distance from the gate lines. In general, a significant number of microtips serve together as a single pixel for the total display. Note that, even though the local electric field in the immediate vicinity of a microtip is in excess of 1 million volts/cm., the externally applied voltage is only of the order of 100 volts.

Field emission displays are normally intended for human viewing rather than as light sources in photoprinters. We are unaware of any prior art that discloses their use as print heads or similar application.

SUMMARY OF THE INVENTION

It has been an object of the present invention to provide a print head, for a photoprinter, that is both compact and relatively cheap to manufacture.

Another object of the present invention is to provide a print head based on Field Emission Display technology.

Yet another object of the present invention is to provide an efficient interface for transmitting the light emitted by said print head to the surface of a rotatable photosensitive drum.

A still further object of the present invention is to provide a method for manufacturing said print head.

These objects have been achieved by the provision of a print head comprising parallel substrates, with the space between them being permanently evacuated. The bottom substrate supports an array of microtips that rest on cathode columns. Gate lines, orthogonally disposed relative to the cathode columns are located at the top level of the microtips and have openings through which the microtips can emit electrons, due to field emission, which bombard a nearby conductive phosphor layer, thereby emitting light. A bundle of transparent fibers, cast in a suitable medium, are permanently and transparently attached to the upper surface of the top substrate. The far side of the fiber bundle may be ground and polished to fit the contours of a rotatable photosensitive drum.

BRIEF DESCRIPTION OF THE DRAWINGS

FIG. 1 is a schematic representation of a LED based photoprinter of the prior art.

FIG. 2 is a closeup view of the LED light source seen in FIG. 1

DESCRIPTION OF THE PREFERRED EMBODIMENTS

Figure 3:
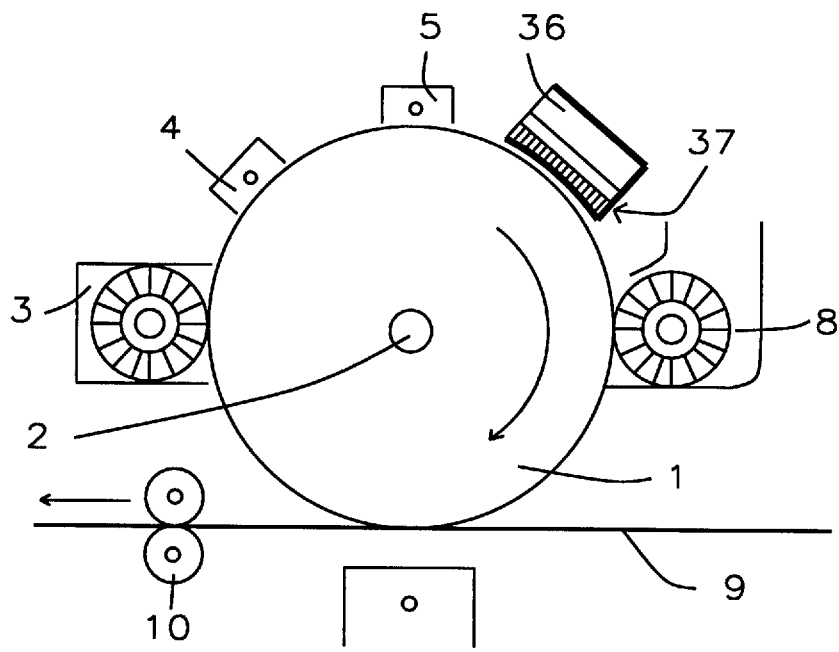
FIG. 3 is a schematic view of a FED based photoprinter as taught by the present invention.

Referring now to FIG. 3, we show there a schematic representation of a photoprinter similar in many respects to the photoprinter shown earlier in FIG. 1. A key departure from the prior art is the incorporation of FED 36 as the print head, together with fiber optic bundle 37 as the light to drum interface.

Figure 4:
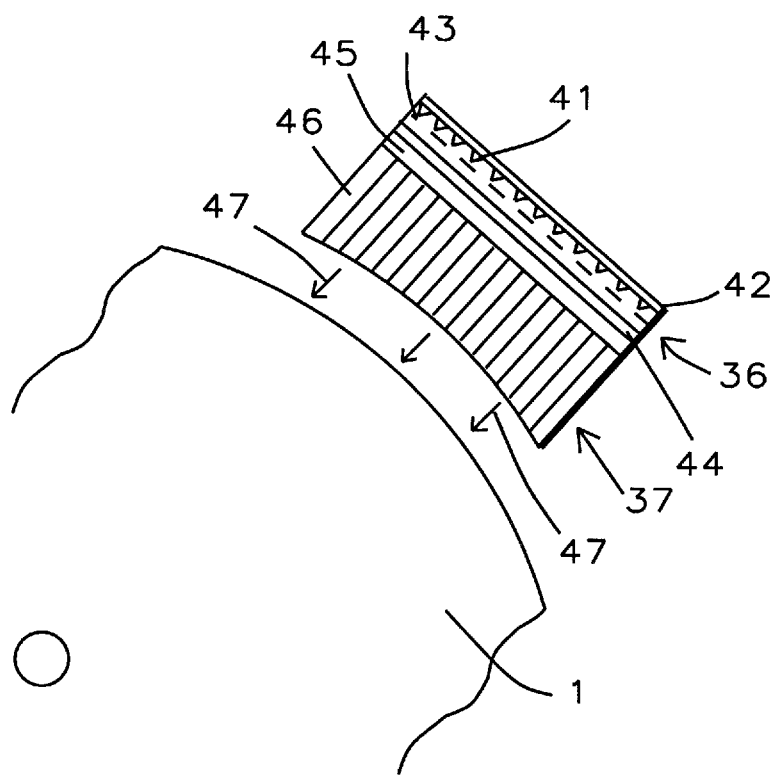
FIG. 4 is a closeup view of the FED based print head seen in FIG. 3.

A more detailed view of the FED based print head is shown in FIG. 4. The various components making up FED 36 will be described in greater detail below when we consider FIG. 6. Fiber optic bundle 37 comprises an array of transparent fibers, such as 46, frozen in fixed spatial relationship to one another as a consequence of being cast in a suitable medium such as silicone resin (not explicitly shown). The fibers themselves could be of plastic or glass.

The dimensions of said fiber array are such that each fiber, such as 46, is self-focussed to the light spot on phosphor screen 44 associated with said microtip. Since top plate (or substrate) 45 is relatively thin, essentially all the light (due to a single microtip or multi-tip group) at surface 44 enters the appropriate optical fiber, such as 46, and is transmitted, with little loss, to the other end, emerging as collimated light beam 47. In FIG. 4 the surface, in which the light emitting ends of the optical fibers lie, is depicted as concave so as to follow the contour of the outer surface of electrostatic drum 1. This is necessary for FED based print heads that are able to print several lines at the same time but single line print heads said surface could be planar, with little or no loss in efficiency, thereby reducing the cost of its manufacture. In general, the distance between the print head and the surface of the drum is between about 0.5 and 5 mm. Note that multi-line printing allows for operation at higher speeds.

Figure 5:
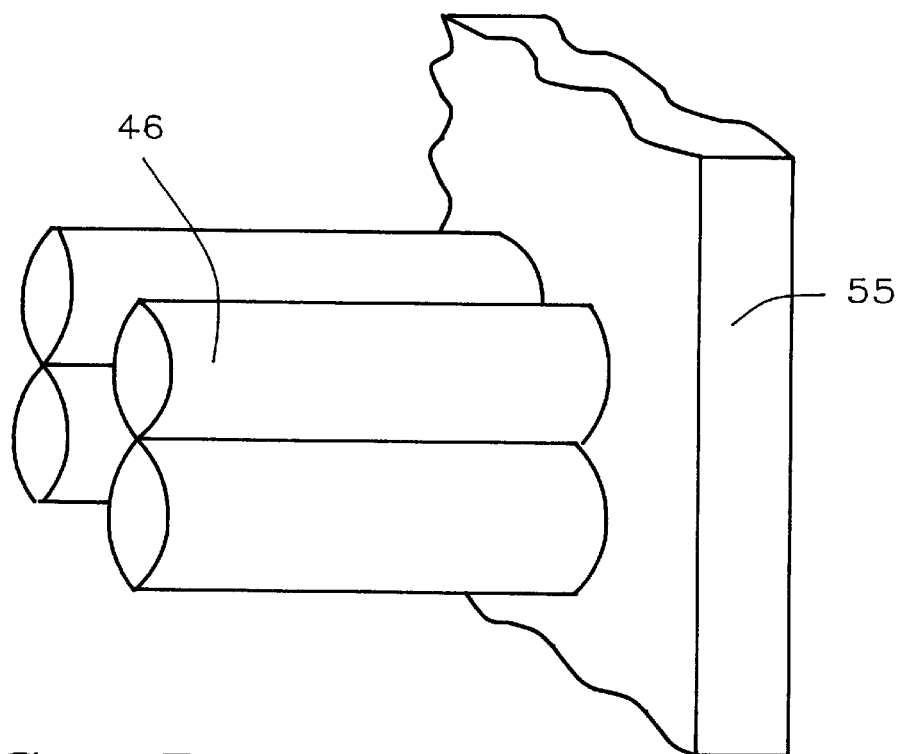
FIG. 5 is a closeup view of part of the fiber optic bundle that is part of FIG. 4

FIG. 5 shows an isometric view of a few fibers, such as 46. Said fibers are transparently and permanently attached to the outer surface of FED top plate 55 (designated 45 in FIG. 4). The refractive indices of 46 and 55 (as well as that of the attachment material) are sufficiently close so that essentially no light from 55 is reflected at its interface with 46. The average length of the fibers is between about 0.5 and 1 cm. while their density within the bundle is between about 1 and 10,000 fibers per mm$^2$, depending on the refractive index gradient of the fibers being used.

Figure 6:
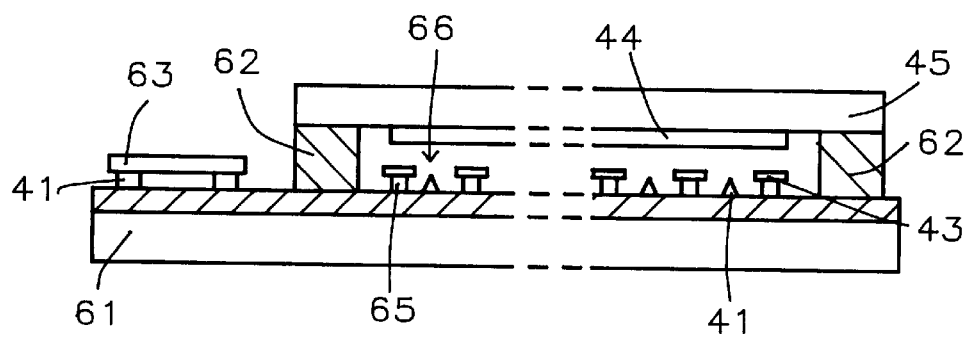
FIG. 6 is a schematic cross-section of the FED portion of FIG. 4.

FIG. 6 is a schematic cross-section of FED 36, showing the basic elements of a typical cold cathode display. Metallic lines 42 are formed on the surface of insulating substrate 61. Said lines are referred to as cathode columns. At regular intervals along the cathode columns, microtips such as 41 are formed. These are typically cones of height about one micron and base diameter about one micron and comprise molybdenum or silicon, though other materials may also be used.

Metallic lines 43 are formed at right angles to the cathode columns, intersecting them at the locations of the microtips. A layer of insulation 65 supports lines 43, which are generally known as gate lines, placing them at the top level of the microtips, that is at the level of the apexes of the cones 41. Openings 66 in the gate lines 43, directly over the microtips, allow streams of electrons to emerge from the tips when sufficient voltage is applied between the gate lines and the cathode columns. Because of the local high fields right at the surface of the microtips, relatively modest voltages, of the order of 100 volts are sufficient.

Figure 7:
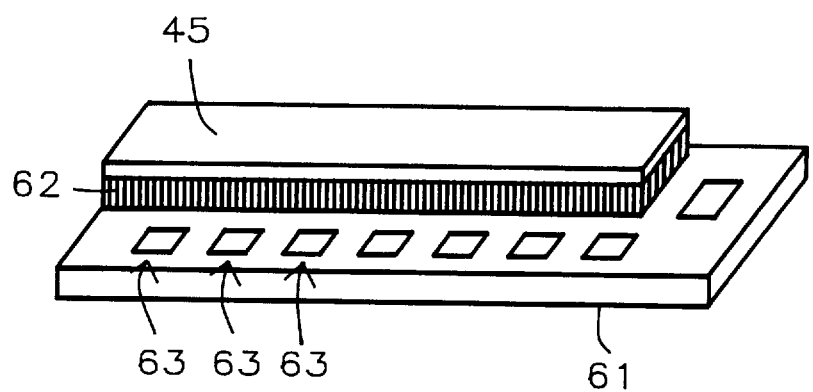
FIG. 7 is an isometric view of FIG. 6.

After emerging through the openings 66 in the gate lines, electrons are further accelerated so that they strike phosphor screen 44 where they emit visible light. Said phosphor screen is separated from the cold cathode assembly by spacers 62 and the space between these two assemblies is evacuated to provide and maintain a vacuum of the order of $10^{-7}$ torr. Control of voltage on cathode columns 42 and gate lines 43, determining which microtip(s) will be emitting electrons at any given time, is provided by driver IC 63. An isometric view of the FED seen in FIG. 6 is shown in FIG. 7.

Returning to FIG. 6, we now describe a process for manufacturing a FED based print head. Metallic layer 42 is deposited onto the upper surface of substrate 61 and is patterned and etched to form cathode columns. Dielectric layer 65 is then deposited followed by the deposition of metallic layer 43 which is then patterned and etched to form gate lines 43, running at right angles to said cathode columns 42. Openings 66 are then formed in both gate lines 43 and dielectric layer 65, down to the level of 42, wherever the gate lines and the cathode columns overlap each other. An array of microtips is then formed, one microtip 41 per opening 66. Next, conductive phosphor layer 44 is deposited on the lower surface of top substrate 45 which is then permanently positioned so as to be parallel to bottom substrate 61, by means of spacers 62. The space between the two substrates is then permanently evacuated.

Using a suitable fixture, a bundle of transparent fibers is laid out in such a manner that the relative locations of the fibers to each other is the same as that of the microtips in the just described FED. In terms of the pixels that are associated with the FED, this corresponds to a pixel array measuring between about 1,000 and 3,000 by between about 1 and 40. The fiber bundle is then cast in a suitable medium such as silicone resin so that the fibers will retain their relative locations permanently. One end of the frozen fiber bundle is then ground and polished to form a smooth back plane. The other end of the fiber bundle is also ground and polished to either a planar or a cylindrically concave surface, depending on the width of the structure, as discussed above.

The back plane of the fiber bundle is then placed against the outer surface of top substrate 45 and translated and/or rotated until each fiber is self-focussed between a light spot and the drum.

To illustrate the effectiveness of the present invention we compare, in TABLE I below, several printer characteristics for several different printer types, including the present invention:

TABLE I

| Characteristic | Thermal1 | Thermal2 | ink jet | photo electr. | dot matrix | This invention |
|---|---|---|---|---|---|---|
| Speed | B | F | B | G | B | G |
| Resolution | B | F | B | G | B | G |
| Size | F | F | F | B | F | G |
| Mfg. Cost | F | F | F | B | F | G |
| Noise | F | F | F | F | B | F |
| Run cost | P | B | F | P | F | F |
| Color | B | F | F | P | F | F |

Thermal1 = color tape
Thermal2 = thermal sensitivity paper
G = good to excellent;
F = fair;
P = poor;
B = bad Of particular note are the poor ratings for other (non FED print head) photoprinters with respect to printer size and manufacturing cost. This is because FED technology is based on glass substrates, which may be as large as a meter on a side. LEDs, by contrast, are formed from GaAs substrates which have size limitations of about 3 inches. So, for long FED print heads, multiple individual units need to be packaged together. For example, for an A4 size print head, 40 separate LED units are needed.

While the invention has been particularly shown and described with reference to the preferred embodiments thereof, it will be understood by those skilled in the art that various changes in form and details may be made without departing from the spirit and scope of the invention.

What is claimed is:

1. A method for manufacturing a field emission based print head comprising:

providing top and bottom substrates, each having upper and lower surfaces;

depositing a first metallic layer on the upper surface of the bottom substrate;

patterning and etching said first metallic layer to form cathode columns;

depositing a dielectric layer on said substrate and said cathode columns;

depositing a second metallic layer on said dielectric layer and then patterning and etching said second metallic layer to form gate lines, orthogonally disposed relative to said cathode columns;

forming openings in said gate lines and dielectric layer at the overlaps between the gate lines and the cathode columns;

forming an array of microtips, one of said microtips being located in each of said openings;

depositing a conductive phosphor layer on the lower surface of the top substrate;

permanently positioning the top substrate parallel to the bottom substrate and evacuating all space between the substrates;

casting a bundle of transparent fibers, each fiber having a front and a back end, in a suitable medium;

grinding and polishing the back ends of said fibers until they lie in a smooth plane;

grinding and polishing the front ends of said fibers until they form a smooth interfacing surface; and permanently and transparently attaching said fiber back ends to the upper surface of said top substrate.

2. The method of claim 1 wherein said interfacing surface is a plane.

3. The method of claim 1 wherein said interfacing surface is cylindrically concave.

* * * * *